T. C. BRANDON.
POWER TRANSMISSION.
APPLICATION FILED FEB. 15, 1921.

1,418,517.

Patented June 6, 1922.
2 SHEETS—SHEET 1.

Inventor
Theodore C. Brandon.

By Harry Schroeder
Attorney

T. C. BRANDON.
POWER TRANSMISSION.
APPLICATION FILED FEB. 15, 1921.
1,418,517.
Patented June 6, 1922.
2 SHEETS—SHEET 2.
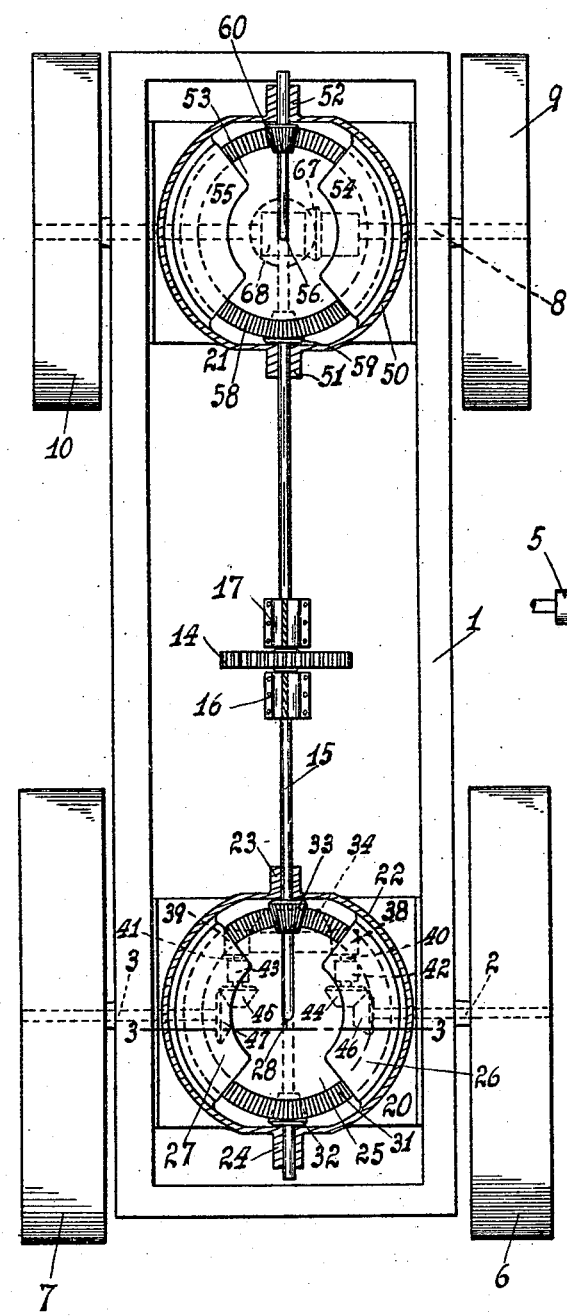
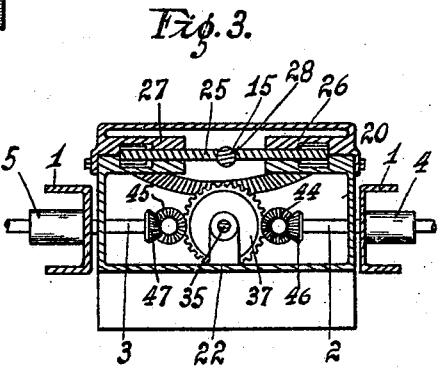
Inventor
Theodore C. Brandon.
By Harry C. Schroeder
Attorney

UNITED STATES PATENT OFFICE.

THEODORE C. BRANDON, OF FALLON, NEVADA.

POWER TRANSMISSION.

1,418,517. Specification of Letters Patent. Patented June 6, 1922.

Application filed February 15, 1921. Serial No. 445,240.

*To all whom it may concern:*

Be it known that I, THEODORE C. BRANDON, a citizen of the United States, residing at Fallon, in the county of Churchill and State of Nevada, have invented certain new and useful Improvements in Power Transmission, of which the following is a specification.

My invention is an improved power transmission of great strength, particularly applicable to four wheel drive tractors.

Referring to the annexed drawings in which my invention is illustrated, and which forms a part of this specification:

Figure 2 is a horizontal section of said tractor taken on the line 2—2 of Figure 1.

Figure 3 is a transverse vertical section of the rear wheel drive unit taken on line 3—3 of Figure 2.

Figure 1:
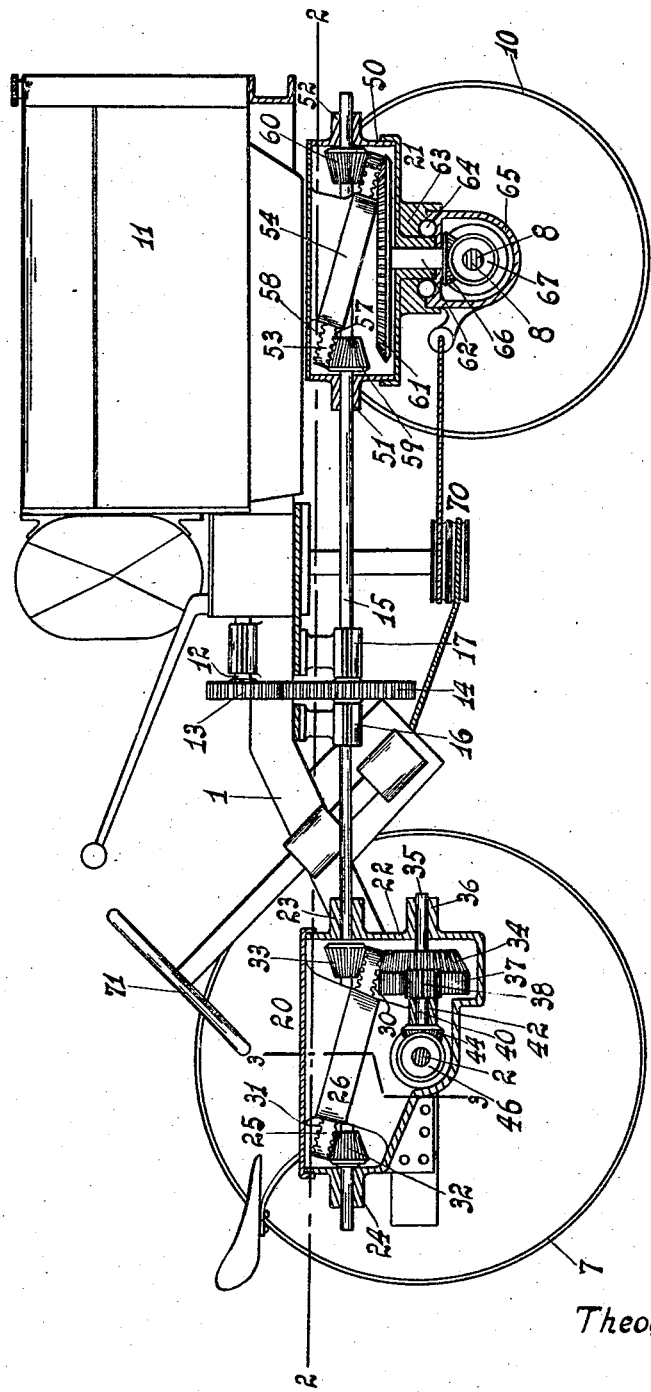
Figure 1 is a longitudinal vertical section of a four wheel drive tractor embodying my invention.

In the drawing my invention is shown applied to a four wheel drive tractor which includes a frame 1; right and left rear axles 2 and 3 journaled in bearings 4 and 5 on the rear end of the frame at the right and left side thereof; right and left wheels 6 and 7 secured on the outer ends of said axles respectively; a front axle 8; front wheels 9 and 10 secured on the right and left ends of said front axle; and an engine 11 mounted on the front end of the frame 1. The engine drive shaft 12 carries a pinion 13 which meshes with a gear 14 on the power transmission shaft 15 extending centrally and longitudinally of the frame 1 and journaled in bearings 16 and 17 depending from said frame at the sides of said gear respectively.

My power transmission as herein disclosed includes a rear power transmission unit 20 and a front power transmission unit 21.

The unit 20 will now be described. A casing 22 is bolted to the rear end of the frame 1 and is formed with bearings 23 and 24 in the front and rear walls thereof in which bearings the rear end of the power transmission shaft 15 is journaled, said shaft extending through the upper part of said casing. A ring gear 25 is journaled at an angle concentrically around the rear end of shaft 15 within the casing 22, in bearings 26 and 27 on the inside of the right and left walls of the casing, said shaft extending through the opening 28 in the gear, over and under the gear and the gear bearing at the right and left sides respectively of its periphery, and at its lower and upper sides in said bearings. The gear 25 has teeth 30 on its under side and teeth 31 on its upper side, the teeth 30 meshing with the teeth on the under side of a bevel pinion 32 secured on the shaft 15 within the casing 22, and the teeth 31 meshing with the teeth on the upper side of a bevel pinion 33 secured on the shaft 15 within the casing 22. The teeth 30 also mesh with the teeth of a bevel gear 34 secured within the casing 22 on a shaft 35 journaled in bearings 36 in the casing 22. On the shaft 35 adjacent the rear side of bevel gear 34 a spur gear 37 is secured which meshes with pinions 38 and 39 within the casing 22 secured on the forward end of shafts 40 and 41 respectively, which shafts are journaled in bearings 42 and 43 in the casing 22. On the rear end of shafts 40 and 41 within the casing 22 are secured bevel pinions 44 and 45 which respectively mesh with pinions 46 and 47 respectively secured on the inner ends of the axles 2 and 3 within the casing 22 into which casing said ends of said axles extend.

The unit 21 will now be described. A casing 50 is secured in the forward end of the frame 1 and is formed with bearings 51 on its rear and front walls in which the forward end of the shaft 15 is journaled, said shaft extending through the casing. A ring gear 53 is journaled at an angle concentrically around the shaft 15 within the casing 50 in bearings 54 and 55 on the inside of the right and left side walls of said casing, said shaft extending through the opening 56 in said gear under the rear and over the forward side thereof, and said bearings engaging the periphery of said gear at the right and left side respectively and the lower and upper sides of the gear. The gear 53 has teeth 57 on its under side and teeth 58 on its upper side, said teeth respectively meshing at diametrically opposite points with bevel pinions 59 and 60 on the shaft 15 within the casing 50. The teeth 57 also mesh with a horizontal bevel gear 61 secured in the lower part of casing 50 on the upper end of a live king bolt 62 journaled in a vertical bearing 63 on the lower wall of said casing. In the lower end of bearing 63 is a ball bearing 64 by means of which the bearing 63 is turnably mounted on the differential casing 65 in which the inner ends of the split front shaft 8 are journaled. The lower end of the king bolt 62 extends into the upper part of the differential casing 65 and carries a bevel gear 66 which meshes with the bevel gear 67 of the differential 68 on the front of shaft 8. The front wheels 9 and 10 are steered by the steering gear 70 which includes a steering wheel 71.

The power transmission shaft 15 drives the gear 37 through the medium of bevel gears 32 and 33, inclined gear 25, and bevel gear 34, and the gear 37 drives the rear wheel 6 through pinion 38 and bevel pinions 42 and 46, and the rear wheel 7 through pinion 37 and bevel pinions 45 and 47. The power transmission shaft 15 drives the front wheels 9 and 10 through bevel pinions 59 and 60, canted gear 53, bevel gear 61, king bolt 62, bevel gear 66, the differential bevel gear 67 and the differential 68.

The application of power from the transmission shaft by bevel pinions to a canted gear at two diametrically opposite points, and the transmission of power through said canted gear provides a transmission mechanism of great strength, durability and efficiency.

Having described my invention, I claim:

In a power transmission for tractors, a power transmission shaft, an inclined ring gear mounted concentrically of said shaft, teeth on the upper side and teeth on the lower side of said gear, a bevel gear on said shaft meshing with the teeth on the upper side of said gear, a bevel gear on said shaft meshing with the teeth on the lower side of said gear, two tractor axles, right and left tractor wheels on said axle respectively, a bevel gear meshing with one set of teeth on said inclined gear, a spur gear rotatable by said bevel gear concentrically therewith, two shafts, a pinion on one end of each of said shafts meshing with said spur gear, a bevel gear on the other end of said two shafts respectively, and bevel gears on said two axles respectively meshing with said bevel gears respectively on said two shafts.

In testimony whereof I affix my signature.

THEODORE C. BRANDON.